United States Patent [19]

Hargreaves et al.

[11] 3,915,344

[45] Oct. 28, 1975

[54] FEEDING OF MATERIALS

[75] Inventors: Derek Burtt Hargreaves, Adlington, near Macclesfield; Eric Staniforth, Rainow; George Edward Hobbs, Poynton, all of England

[73] Assignee: National Research Development Corporation, Great Britain

[22] Filed: June 12, 1974

[21] Appl. No.: 478,672

Related U.S. Application Data

[63] Continuation of Ser. No. 223,792, Feb. 4, 1972, abandoned, which is a continuation of Ser. No. 855,843, Sept. 8, 1969, abandoned.

[30] Foreign Application Priority Data

Sept. 13, 1968  United Kingdom............... 43562/68
Apr. 28, 1969  United Kingdom............... 21549/69

[52] U.S. Cl.................................. 222/134; 222/142
[51] Int. Cl.²......................................... B65G 65/48
[58] Field of Search ............. 222/134, 142, 135, 57; 259/154

[56]  References Cited
UNITED STATES PATENTS 2,895,644  7/1959  Pande................................ 222/134
3,037,671  6/1962  Cochran ........................... 222/142

Primary Examiner—Robert B. Reeves
Assistant Examiner—John P. Shannon
Attorney, Agent, or Firm—Alan H. Levine

[57]  ABSTRACT

The invention provides an apparatus for mixing and dispensing of different particulate materials in accurately controlled proportions. The apparatus includes at least two containers each having metering rollers associated therewith, a transmission for operating said metering rollers and means for altering the rate at which particulate material received from at least one container is dispensed by the metering rollers, and a collection hopper for dispensing together all the particulate material issuing from the metering rollers to a desired location. Conveniently there will be two containers, each with its own metering rollers, one of which at least will have a variable operating transmission.

4 Claims, 3 Drawing Figures

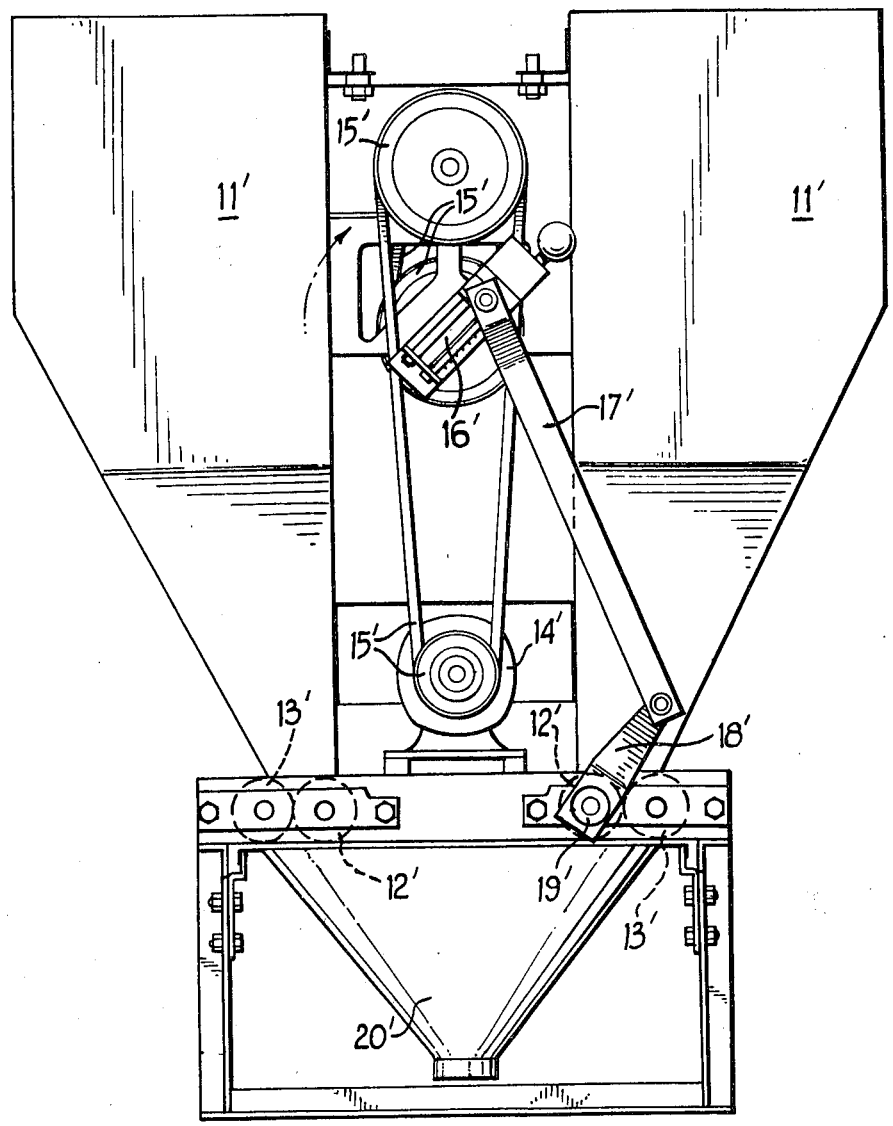

FEEDING OF MATERIALS

This application is a continuation of application Ser. No. 223,792, filed Feb. 4, 1972, now abandoned, which was a continuation of application Ser. No. 855,843, filed Sept. 8, 1969, now abandoned.

This invention concerns the mixing and dispensing of particulate material which term is intended to include all kinds of sub-divided material be it in the form of grains, seeds, granules, fragments, short lengths or the like, (hereinafter referred to as "particulate material").

There is often a need to mix together two or more different particulate materials. For example, in the plastics industry, it is often necessary to mix particulate plastics materials of different colours in accurate proportions so that when the mixed material is used to make a product, the colour of the particulate is of a constant definite shade. Again, in the same industry, it is often desired to mix together virgin and reclaimed particulate material in accurately controlled proportions.

Again by way of example, in agriculture, it is often necessary to supply seed and fertilizer in selected proportions, to a drill or furrow. In the former case the apparatus will usually be static (associated, for instance, with an extruder); in the latter case the apparatus will be mounted on an agricultural vehicle, and therefore mobile.

The object of the present invention is to provide convenient, accurate, and relatively inexpensive apparatus whereby at least two different particulate materials may be readily mixed together and dispensed in accurately controlled proportions.

According to the present invention apparatus for mixing together and dispensing at least two different particulate materials in accurately controlled proportions comprises at least two containers, metering means associated with each said container adapted continuously to receiving particulate material from its container drive means for said metering means, means for altering the rate at which particulate material is dispensed by at least one said metering means, and means for dispensing together all the particulate material issuing from the feed means to a desired location.

Preferably said means for altering the rate at which said particulate material is dispensed by said metering means comprises adjustable operating means therefor. The adjustable operating means conveniently includes a prime mover, transmission means between the prime mover and said metering means, and variable gearing forming part of the transmission means. Instead of variable gearing an adjustable reciprocating crank in combination with a one-way rotary drive device may be used. Preferably at least one of the metering means consists of a pair of rollers disposed to form a nip through which material reaching the upper side thereof is dispensed at a rate depending upon the speeds and directions of rotation of the rollers, their surface characteristics and their relative dispositions and sizes. In the preferred embodiment of the invention the rollers have coverings of a resilient nature and form a pressurized nip.

The invention will now be described further, by way of example only, with reference to the accompanying drawings, in which, FIG. 1 is a front elevation of one apparatus constructed according to the invention;

FIG. 3 is a front elevation of an alternative apparatus constructed according to the invention.

Figure 1:
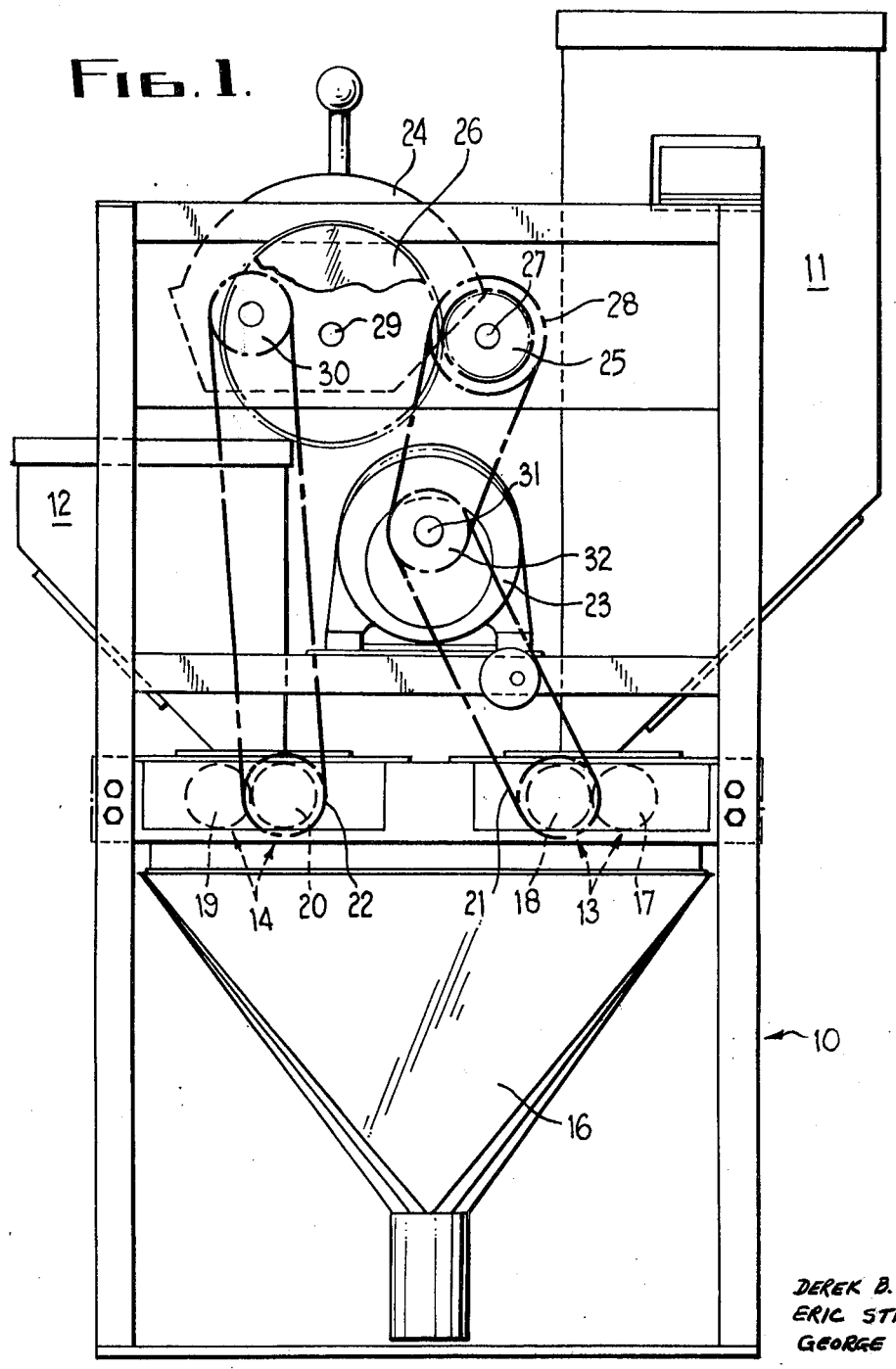
Figure 2:
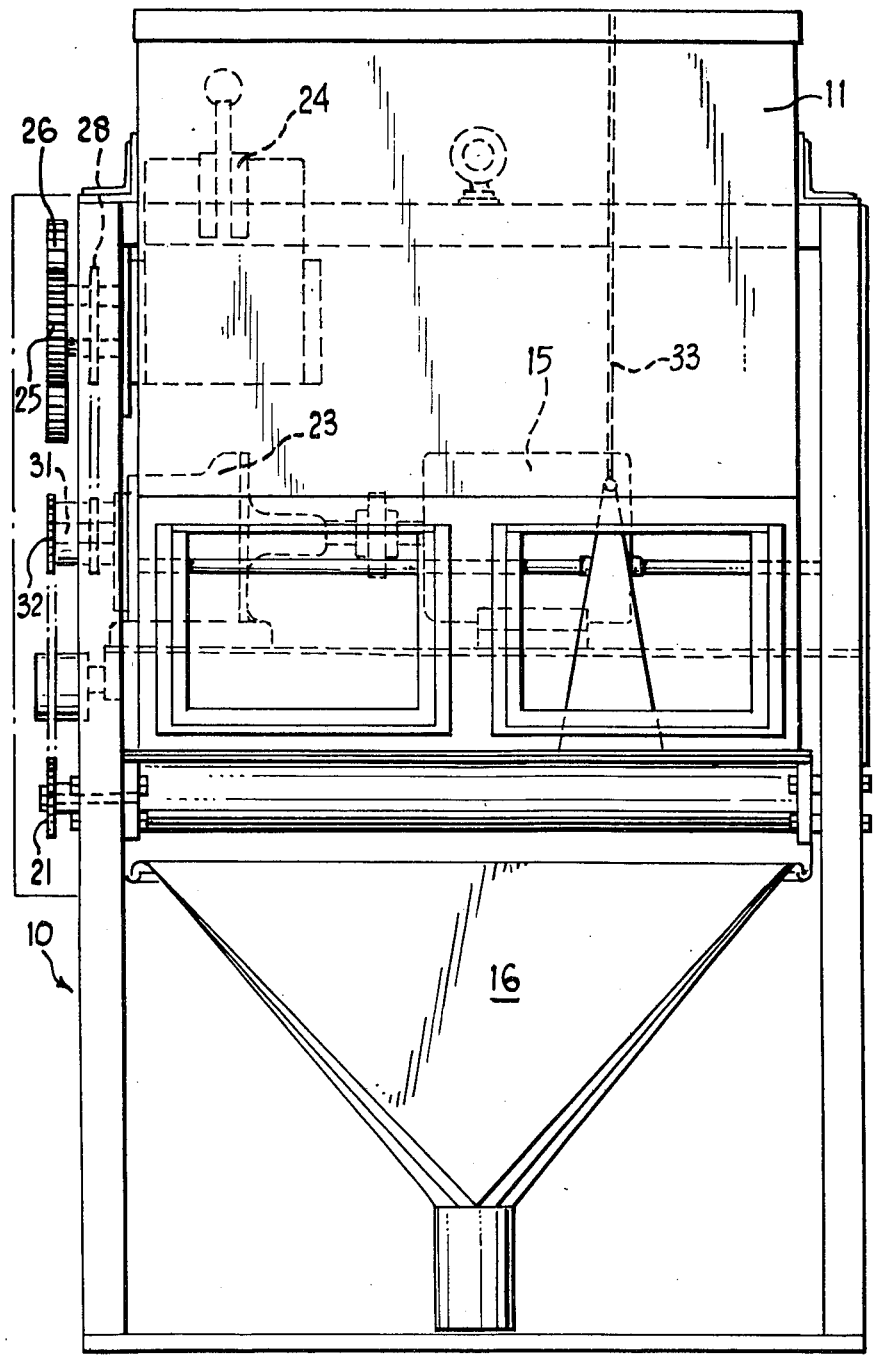
FIG. 2 is an end elevation corresponding to FIG. 1.

The apparatus illustrated in FIGS. 1 and 2 comprises basically a framework 10, two feed hoppers 11, 12, two metering means 13, 14, one for each hopper, a drive motor 15 for driving one metering means 14 through a variable gear and the other metering means 13 through a set gear, both metering means dispensing into a collection hopper 16.

The framework 10, which is constructed of suitable angle iron and the like and is supported on castors (not shown) to render the entire machine readily mobile, and supports in its upper half the other parts previously referred to with the exception of the main collection hopper 16, which is supported in its lower half.

In the upper half of the framework 10 there is provided, at one side, a large feed hopper 11 and, at the other side, a small feed hopper 12, each having a removable lid. Beneath the elongated outlet aperture of each hopper 11, 12 is disposed a metering means 13, 14 consisting essentially of a pair of rollers 17, 18, 19, 20 each having a covering of resilient material such as foamed rubber or plastic. The rollers are mounted on parallel horizontal axes, and each pair together form a feed nip between the outlet aperture of the respective hopper. The rollers are supported at each end in suitable bearings. The rollers for each pair carry at one end meshing gear wheels, (not shown for the sake of clarity) and at the same end of one roller of each pair is mounted a chain wheel 21, 22. As will later be apparent the chain wheels 21, 22 allow one roller of each pair to be driven and the meshing gear wheels ensure that the drive is transmitted to the other roller of each pair so as to rotate it in the opposite direction. Between the two feed hoppers 11, 12 is mounted an electric drive motor 15 coupled to a reduction gear box 23 of conventional type, the output shaft 31 of which carries a chain wheel 32. Above the reduction gear box 23, is mounted a variable reduction gear box 24 of the type described and claimed in our prior U.S. Pat. No. 3,447,391. Also at this end of the apparatus is provided a set of change gears 25, 26, one of which is mounted on a stub shaft 27 which also carries a chain wheel 28. The other is mounted on the input shaft 29 of the variable reduction gear box 24 the output shaft of which carries a chain wheel 30. Suitable chains pass around the various chain wheels so as to provide transmissions to the feed means. In this way the drive to feed rollers 17, 18 of the larger hopper 11 is from the electric drive motor 15 to the reduction gear box 23 and thence from the chain wheel 32 to the chain wheel 21. Thus the roller 18 and the roller 17 are rotated. The drive to the rollers 19, 20 beneath the smaller hopper 12 is from the electric motor 15, through the reduction gear box 23, then from the chain wheel 32 to the chain wheel 28, through the change gears 25, 26 through the variable reduction gear box 24 and finally from the chain wheel 30 to the chain wheel 22 to drive the other pair of feed rollers. Thus the transmission between motor 15 and rollers 19, 20 comprises in series a first portion in the form of change gears 25, 26 the transmission ratio of which can be varied over a relatively wide range and a second portion in the form of variable reduction gear box 24, the transmission ratio of which can be varied over a relatively small range. The transmission between motor 15 and rollers 17, 18 is independent of the transmission between motor 15 and rollers 19, 20 and comprises reduction gear box 23 which provides a selected transmission ratio.

It will be apparent that the ratio of the amount of material fed by the two pairs of rollers 17, 18, 19, 20 from the two hoppers 11, 12 can be varied over a wide range. For example, with a given pair of change gears 25, 26 the percentage of the total material which is fed from the smaller hopper 12 may be adjustment of the adjustable reduction gear box 24, be varied between about 1% and 4%. This range may be varied by substituting other change gears, or other chain wheels.

In use the main collection hopper 16, which is supported at each side on runners, may be removed and replaced by two separate collection boxes, one beneath each of the feed hoppers 11, 12. These boxes are used for calibration purposes. Thus it will be known from previous experience which change gears to select so that the given percentage is within the available range. The adjustable reduction gear box is then approximately adjusted and the machine run for a short period. The two collection boxes are then removed and the proportions of the two materials measured. If these are not sufficiently close to the desired proportions then a further adjustment of the adjustable reduction gear box can be made until the required percentage is obtained sufficiently accurately. The main collection hopper is then replaced and the machine is ready for use.

One design of the transmission may be such that with few changes the percentage of material fed from the small hopper 12 may have a range of from 1 to 50%.

If it is desired to mix more than two materials, then this end may be readily achieved by providing one or more separators 33 in one or both of the feed hoppers. The separators would be adjustable along the length of the hoppers and the amount of each material fed from the hopper will depend on the length of the respective feed rollers exposed to the material in the hopper.

The apparatus just described is very useful for feeding the desired proportions of particulate plastics material for bagging or to an extrusion machine, but as will be appreciated, the machine's usefulness is by no means restricted to such applications.

The invention is of course not limited to the particular details of the embodiment just described. For example, the drive means to the feed rollers could take any suitable form which enabled the speeds of rotation of the two sets of rollers to be varied. Another such form is embodied in the apparatus illustrated in FIG. 3 a description of which follows.

Referring now to FIG. 3 it will be seen that the apparatus there depicted consists essentially of two feed hoppers; two metering means, one beneath the outlet end of each feed hopper; adjustable drive means for each metering means; and a collecting hopper. These various parts are carried by suitable frame and support members.

Each feed hopper is designated 11' and is of like configuration. They are mounted so that between them a space is left in which is accommodated certain of the components of the drive means.

Each metering means consists of pairs of rollers 12', 13' having resilient surfaces and mounted so as to form a pressurized nip which receives all the material passing from the outlet end of the respective hopper 11'.

An adjustable drive means is provided at each side of the apparatus. Between the two hoppers 11' is mounted an electric motor 14' which rotates, via suitable V-belt reduction gearing 15' an adjustable slide 16' at each side of the apparatus. Each slide 16' acts as a crank arm and carries one end of a connecting rod 17' which transmits oscillatory rotary motion by its other end to a lever 18'. Each lever 18' transmits this motion to a one way clutch 19' or similar device mounted on one end of one roller 12' of each pair of metering rollers, and thus to this roller, but in one direction only, and the other roller 13' of the pair likewise, by a positive gear connection. It will be clear that by adjusting a slide 16' the one end of the respective connecting rod 17' is caused move in circle of greater or lesser diameter and thus transmit to its lever 18' oscillatory movement of greater or lesser amplitude. By these means the throw of the crank is adjusted and the throughput of the metering rollers 12, 13' may be accurately controlled within wide limits. Preferably the slide 16' is suitably calibrated to enable adjustment to be confidently made.

The supply hopper 20' is disposed so as to receive the output of each metering means and deliver it from its outlet end to an extruder screw (not shown).

We have found that we can by suitable design of the parts provide for the metering of two different materials from the hoppers 11' in proportions ranging from 1:1 to 50:1.

Apparatus according to the invention may incorporate various refinements not described with reference to either of the embodiments illustrated in the drawings. Thus there may be provided in the final dispensing hopper an agitating device to ensure thorough mixing; controls may be incorporated for rendering the drive to the metering means inoperative where, for example, "starve feeding" is necessary; and so on. Clearly the number of different materials which can be metered is limited only by the practical considerations involved in grouping the required number of hoppers and metering means in a single apparatus.

I claim:

1. Apparatus for mixing together and dispensing at least two different particulate materials in accurately controlled proportions, comprising at least two containers, positive metering means associated with each said container, each said metering means being adapted continuously to receive particulate material from its container and to pass only metered material, common drive means for said metering means, first transmission means between said common drive means and one of said metering means and having a selected transmission ratio, second transmission means between said common drive means and another of said metering means, said second transmission means being independent of the first and comprising in series a portion the transmission ratio of which is variable over a wide range and a portion the transmission ratio of which is variable over a small range, said second transmission means being variable to provide a feed rate from the other of said metering means so that the latter delivers from 1% to 50% of the material delivered by said one metering means, and means for collecting together all the particulate material issuing from all said metering means at a desired location.

2. Apparatus as defined in claim 1 in which said means for collecting together all the particulate material issuing from said metering means to a desired location comprises a common hopper.

3. Apparatus as claimed in claim 1 wherein each of said metering means comprises a pair of rollers having coverings of a resilient nature forming between them a pressure nip into which its respective container continuously supplies particulate material.

4. Apparatus for mixing together and dispensing at least two different particulate materials in accurately controlled proportions comprising at least two containers, positive metering means associated with each said conatiner, each metering means being adapted continuously to receive particulate material from its container and to pass only metered material, drive means for said metering means, means for altering the rate of driving of one of said metering means independently of the rate of driving of another of said metering means thereby to alter the rate at which particulate material is dispensed by said one of said metering means independently of the rate at which particulate material is dispensed by said other of said metering means, and means for collecting together all the particulate material issuing from all said metering means at a desired location, said drive means including a drive motor, one drive between said motor and said one metering means, and another drive between said motor and said other metering means, each of said drives including a crank for producing an oscillatory rotary drive, a clutch between each said crank and each said metering means and responsive to said oscillatory rotary drive for imparting unidirectional stepwise movements to its respective metering means, and said means for altering the rate of driving includes means for adjusting the throw of the crank associated with said one drive, said throw-adjusting means being variable so that one of said metering means delivers from 2 to 100% of the material delivered by the other of said metering means.

* * * * *